(12) United States Patent
Deng

(10) Patent No.: US 7,938,040 B2
(45) Date of Patent: May 10, 2011

(54) FOOT COUPLING DEVICE FOR A BICYCLE PEDAL

(76) Inventor: Xiao-Ming Deng, Flushing, NY (US)

( * ) Notice: Subject to any disclaimer, the term of this patent is extended or adjusted under 35 U.S.C. 154(b) by 0 days.

(21) Appl. No.: 11/890,848

(22) Filed: Aug. 8, 2007

(65) Prior Publication Data

US 2008/0156143 A1 Jul. 3, 2008

(51) Int. Cl.
*B62M 3/00* (2006.01)
(52) U.S. Cl. ........................ 74/594.6; 74/594.4
(58) Field of Classification Search ............... 74/594.6, 74/594.1, 594.4; 280/294; 482/79, 80
See application file for complete search history.

(56) References Cited

U.S. PATENT DOCUMENTS

| 493,696 | A | * | 3/1893 | Ferguson | 74/594.6 |
|---|---|---|---|---|---|
| 605,536 | A | * | 6/1898 | Brice | 74/594.5 |
| 634,592 | A | * | 10/1899 | Sieverkropp | 74/594.6 |
| 4,200,005 | A | * | 4/1980 | Mohr | 74/594.6 |
| 4,269,084 | A | * | 5/1981 | Okajima | 74/594.6 |
| 4,442,732 | A | * | 4/1984 | Okajima | 74/594.5 |
| D275,846 | S | * | 10/1984 | Buchanan et al. | D12/125 |
| 4,809,563 | A | * | 3/1989 | Loppnow | 74/594.6 |
| 5,046,382 | A | * | 9/1991 | Steinberg | 74/594.6 |
| 5,251,508 | A | * | 10/1993 | Robbins | 74/594.6 |
| 5,456,138 | A | * | 10/1995 | Nutile et al. | 74/594.6 |
| 5,737,977 | A | * | 4/1998 | Surdi et al. | 74/594.6 |
| 5,916,332 | A | * | 6/1999 | Chen | 74/594.6 |
| 5,924,220 | A | * | 7/1999 | Ueda et al. | 36/131 |
| 6,035,743 | A | * | 3/2000 | Gapinski et al. | 74/594.6 |
| 6,085,614 | A | * | 7/2000 | Lin | 74/594.6 |
| 6,205,885 | B1 | * | 3/2001 | Hermansen et al. | 74/594.6 |
| 6,324,941 | B1 | * | 12/2001 | Ho | 74/594.6 |
| 6,510,764 | B2 | * | 1/2003 | Vito | 74/594.6 |
| 6,877,399 | B1 | * | 4/2005 | Swift | 74/594.6 |
| 6,997,080 | B2 | * | 2/2006 | Muraoka et al. | 74/594.6 |
| 7,021,175 | B1 | * | 4/2006 | Xie | 74/594.6 |
| 7,024,961 | B2 | * | 4/2006 | Hsiao et al. | 74/594.6 |
| 7,174,807 | B2 | * | 2/2007 | Bryne | 74/594.6 |

* cited by examiner

*Primary Examiner* — Justin Krause

(57) ABSTRACT

An inner side upper foot coupling device for a bicycle pedal is provided made of a cylindrical rod. The coupling device has a middle portion that is U-shaped, two poles having different lengths connected to the middle portion and bases connecting to the poles for attachment to a bicycle pedal.

4 Claims, 7 Drawing Sheets

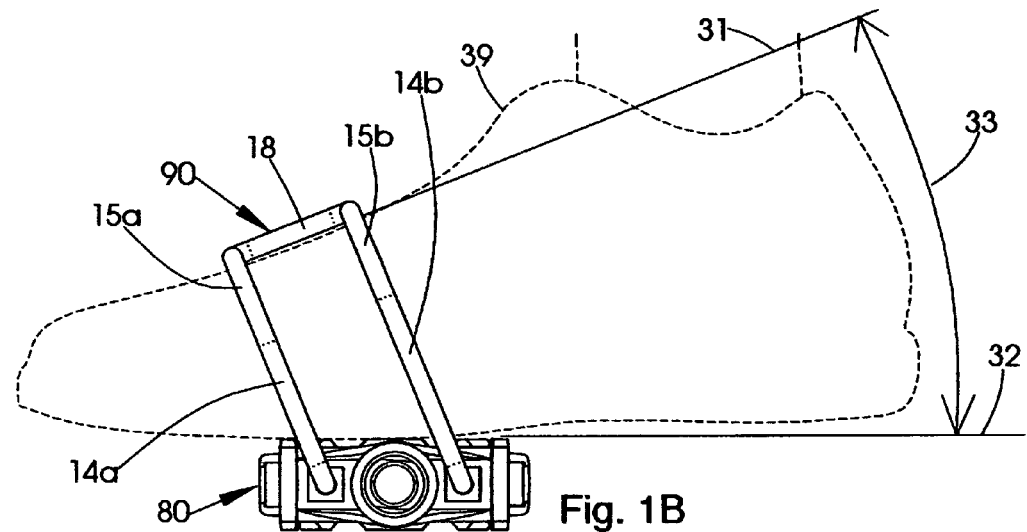
Fig. 1B
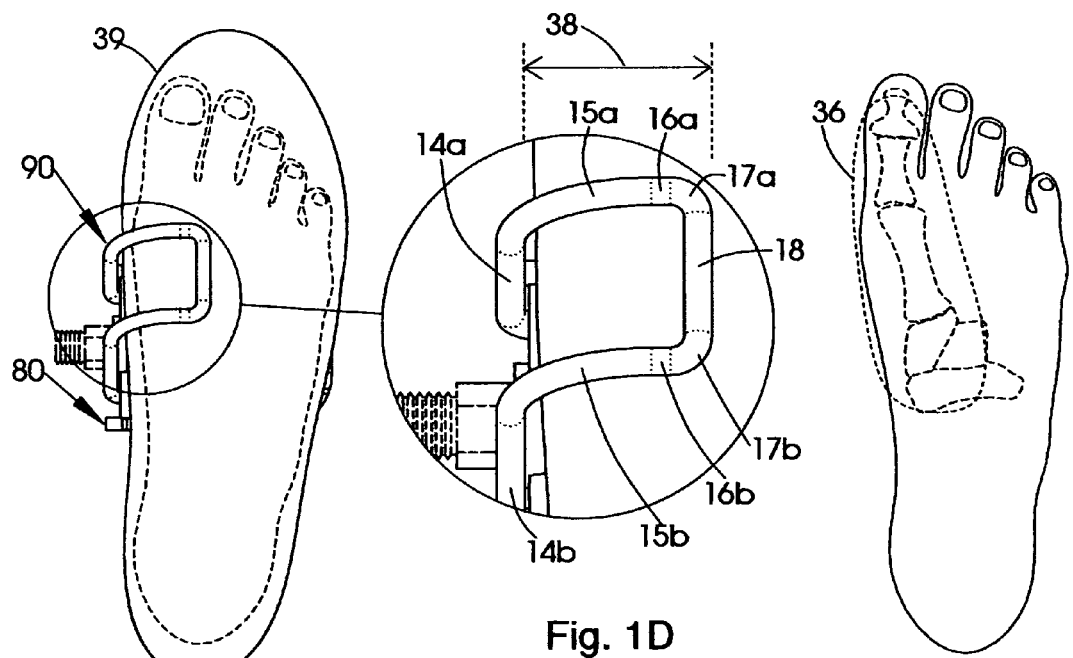
Fig. 1C
Fig. 1D
Fig. 1E

FOOT COUPLING DEVICE FOR A BICYCLE PEDAL

BACKGROUND OF THE INVENTION

This invention relates to a bicycle pedal attachment device made from a cylindrical rod.

Currently, there are special bicycle pedals which allow people to pull in addition to push, using their foot. These special pedals include pedals with straps, pedals with straps and toe clips, and pedals that require a special shoe to engage at the sole. However, many people choose not to use these special pedals to ride a bicycle, they choose to use a regular bicycle pedal that is limited only to pushing, because:

a) people do not feel confident enough that once their foot is engaged with one of the special pedals, they can disengage their foot fast enough during an emergency to avoid a bicycle accident, and/or b) pedals that require special shoes are expensive and not user friendly.

OBJECT OF THE INVENTION

The object of the present invention is to provide a new solution to improve push and pull bicycle pedaling. Compared to the prior art, the present invention allows push and pull bicycle pedaling to be more fun and safer by providing the following advantages:

1. providing a better upper foot coupling device that is more comfortable for a foot to apply an upward force,
2. providing a better upper foot coupling device that has more space for a foot to disengage,
3. providing a more user friendly upper foot coupling device so a user can operate a bicycle wearing sneakers
4. providing a better upper foot coupling device that allows a user to step into the pedal more comfortably,
5. providing a better upper foot coupling device that is easier and cheaper to manufacture, and
6. providing a better upper foot coupling device that may be used for indoor cycling as well.

SUMMARY OF THE INVENTION

This invention is made from a bent cylindrical rod with threading at both ends. The bent rod has a U-shaped structure which has a bend at either end of the U-shape, followed by two poles having unequal length, each of the poles being longer than the U-shaped portion. The poles continue with bases bent in the same direction as the U-shaped structure. The bases are designed to be inserted into a bicycle pedal having two holes, at the front and rear of the pedal shaft, respectively.

BRIEF DESCRIPTION OF THE DRAWINGS

FIG. 1b is a side view of the coupling device engaged by a right foot.

FIG. 1c is a top view of the coupling device engaged by a right foot.

FIG. 1d is a detail view of FIG. 1c of the instep contact.

FIG. 1e is a top view of an area of a human foot.

DETAILED DESCRIPTION OF THE INVENTION

First Embodiment

Figure 1A:
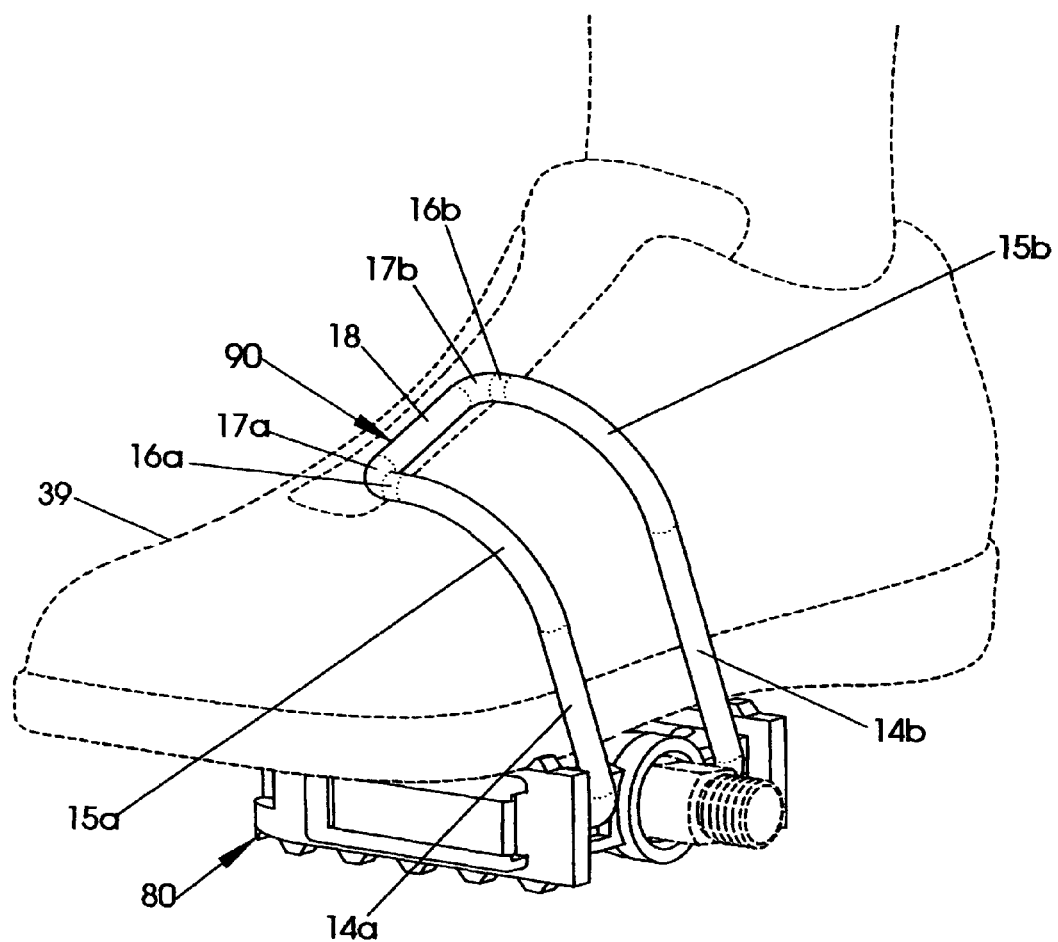
FIG. 1a is a perspective view of the coupling device engaged by a right foot.
Figure 1F:
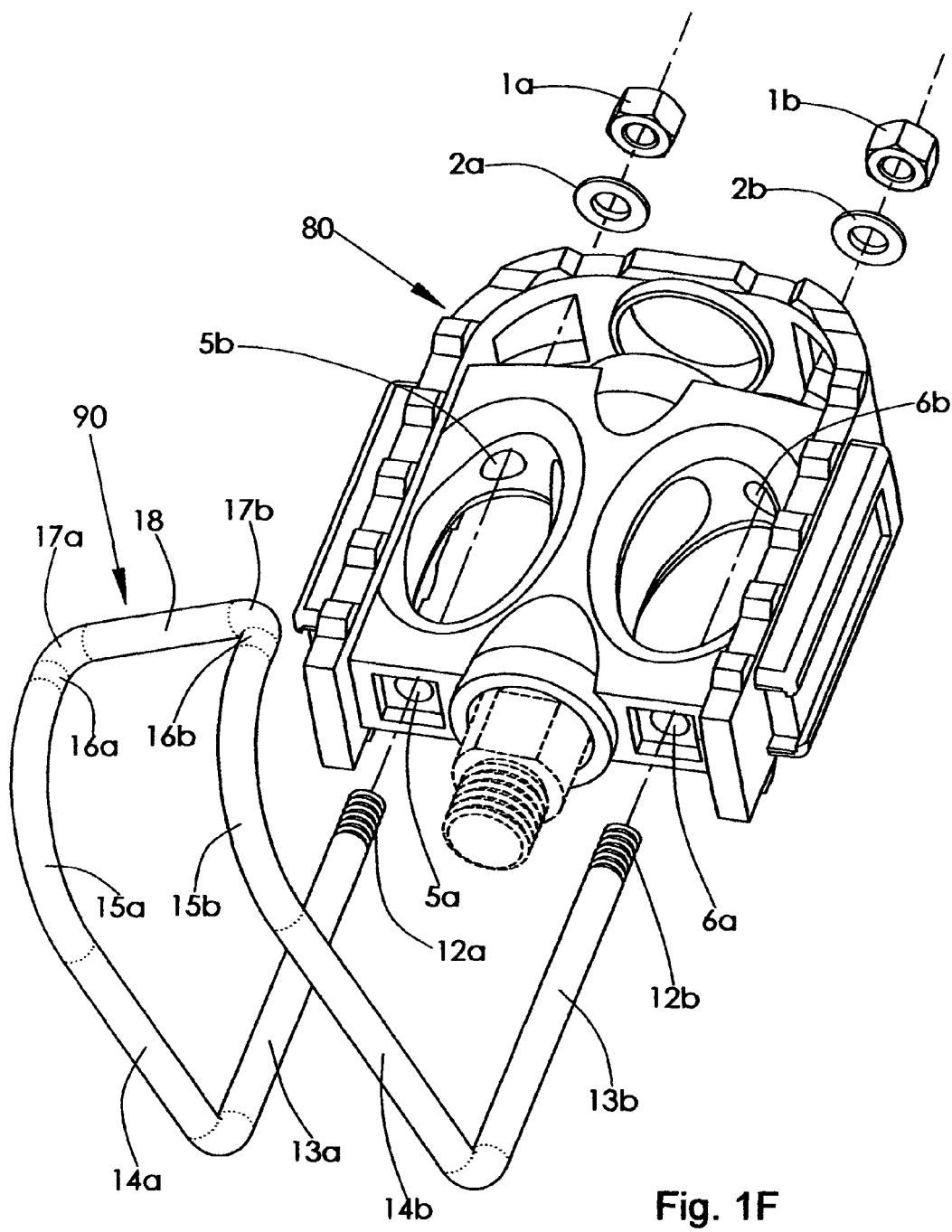
FIG. 1f is an exploded view of the coupling device.
Figure 1G:
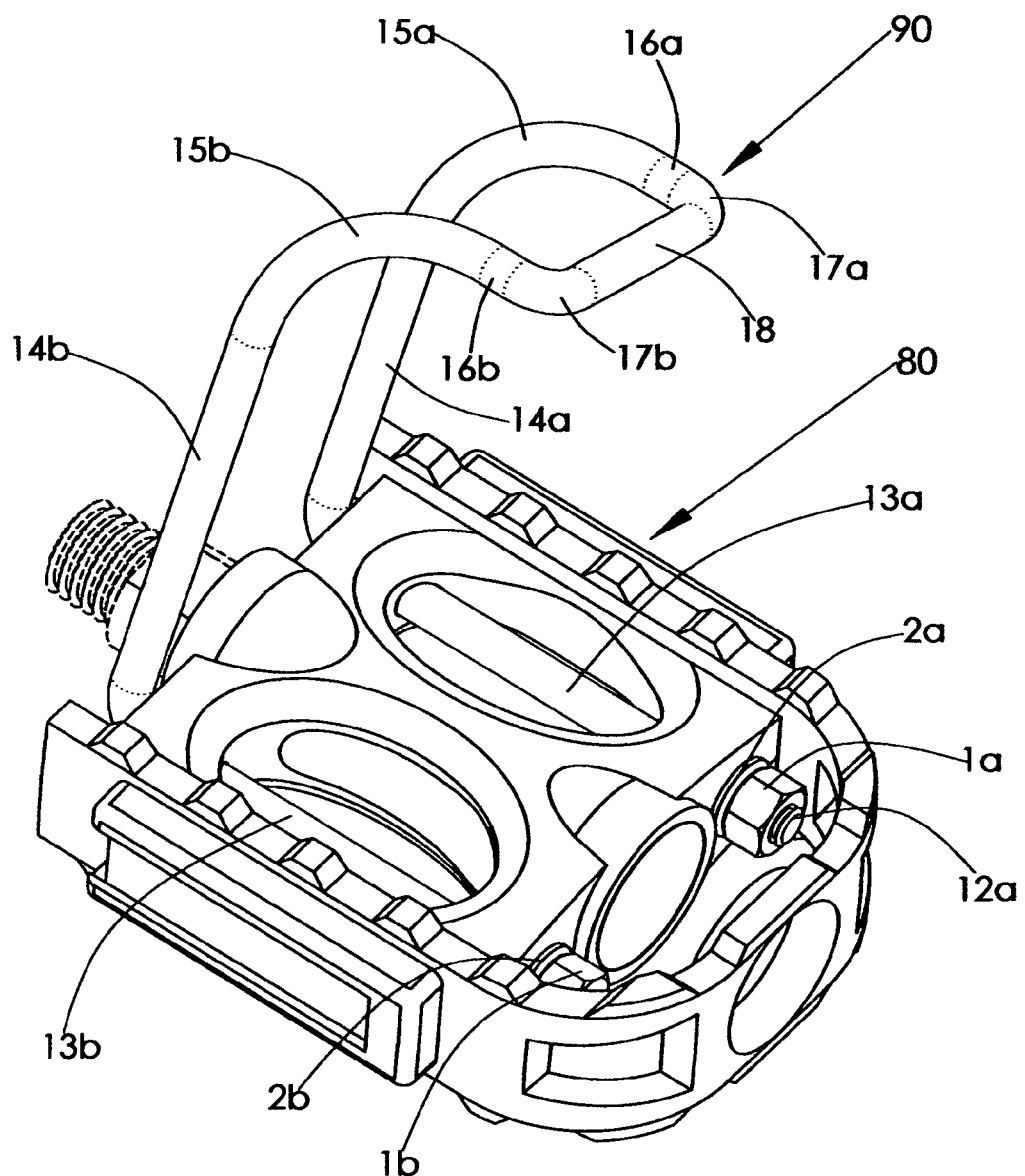
FIG. 1g is a perspective view of the coupling device attached to a pedal.
Figure 1H:
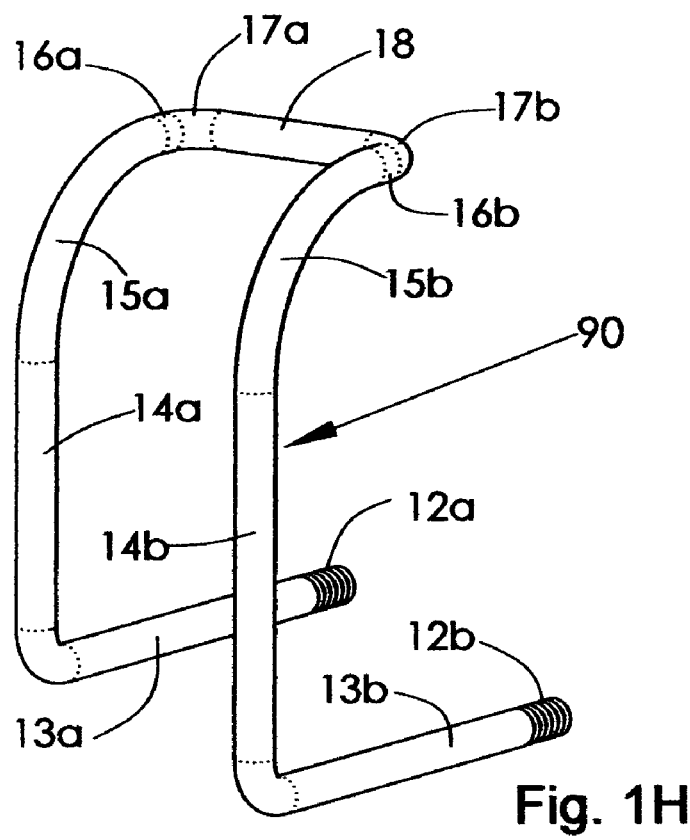
FIG. 1h is a perspective view of the coupling device.
Figure 1I:
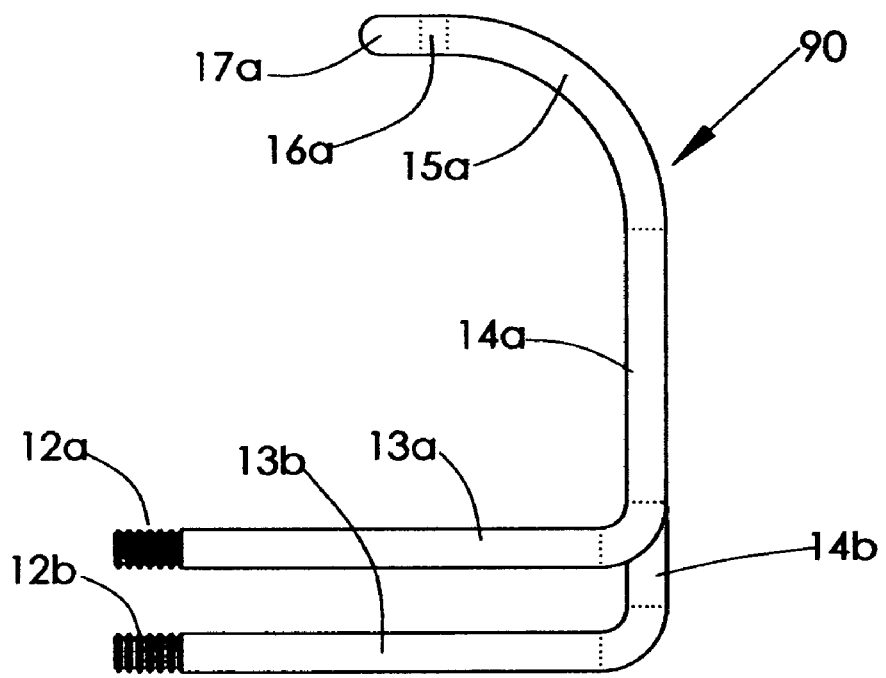
FIG. 1i is a side view of the coupling device.
Figure 2A:
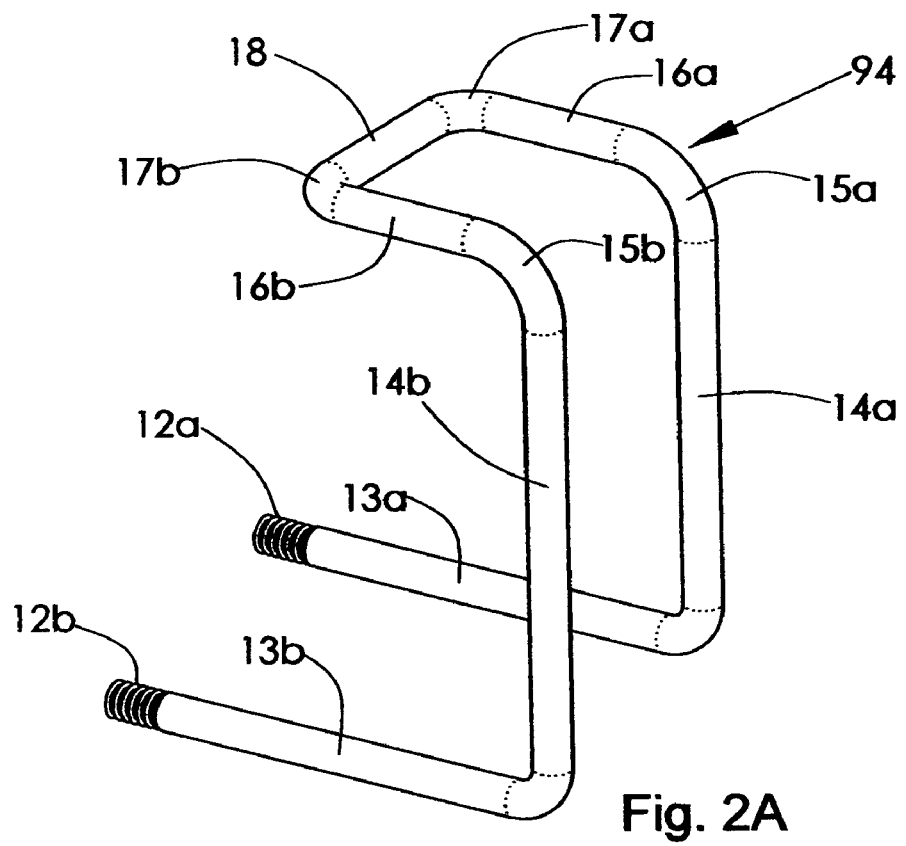
FIG. 2a is a perspective view of a second embodiment of the coupling device.
Figure 2B:
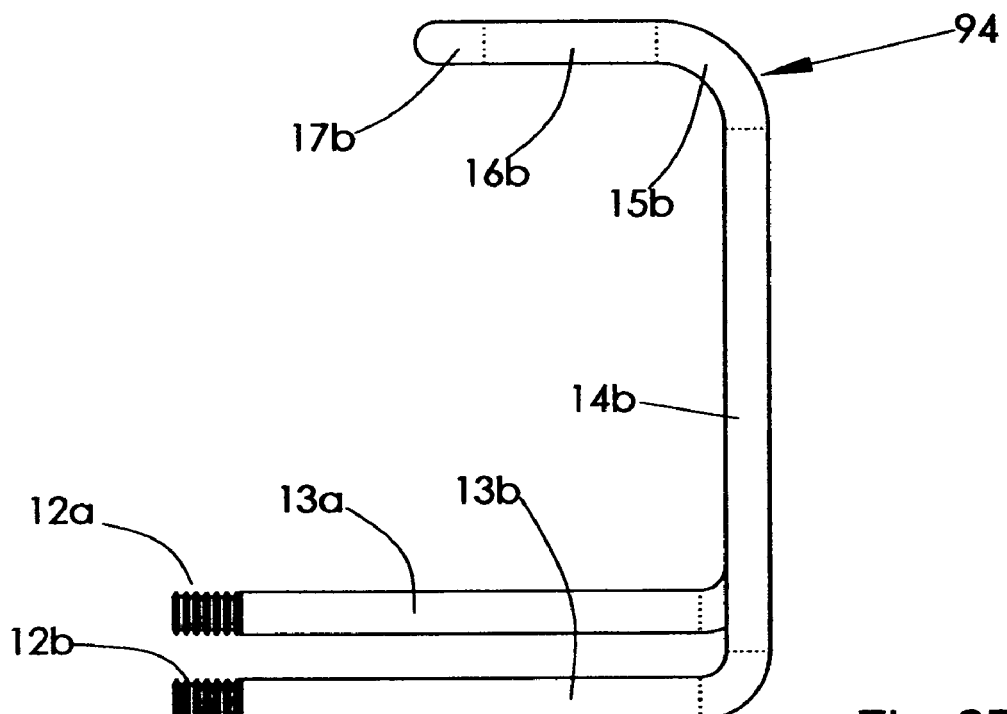
FIG. 2b is a side view of the second embodiment.
Figure 3A:
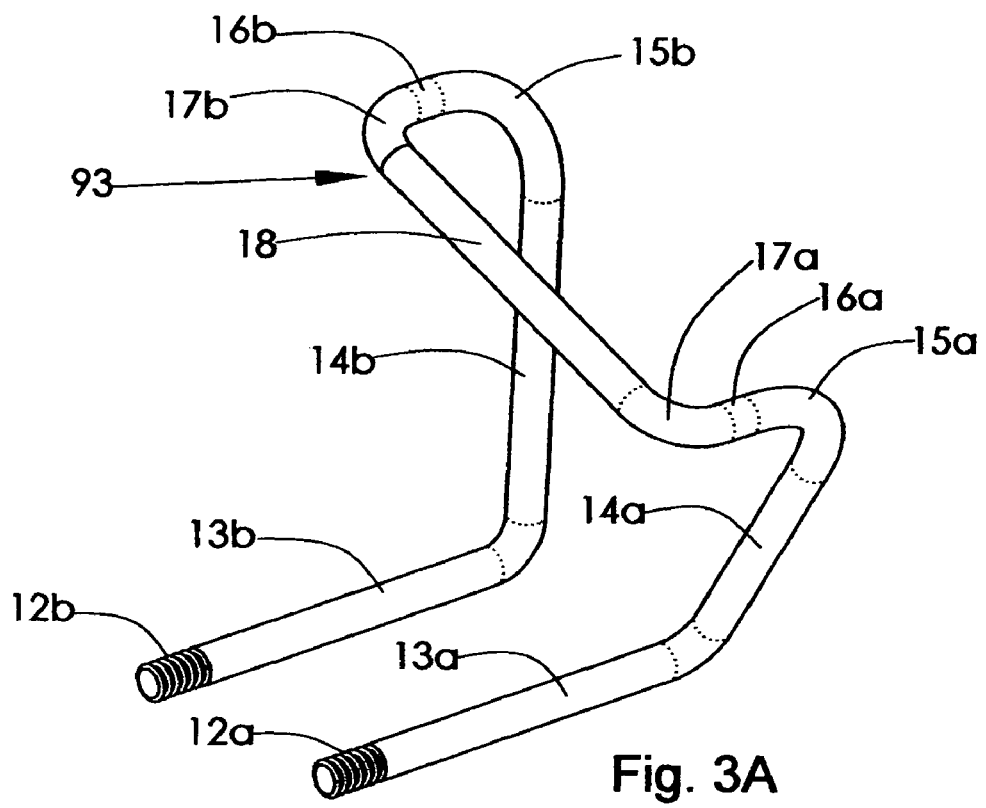
FIG. 3a is a perspective view of a third embodiment of the coupling device.
Figure 3B:
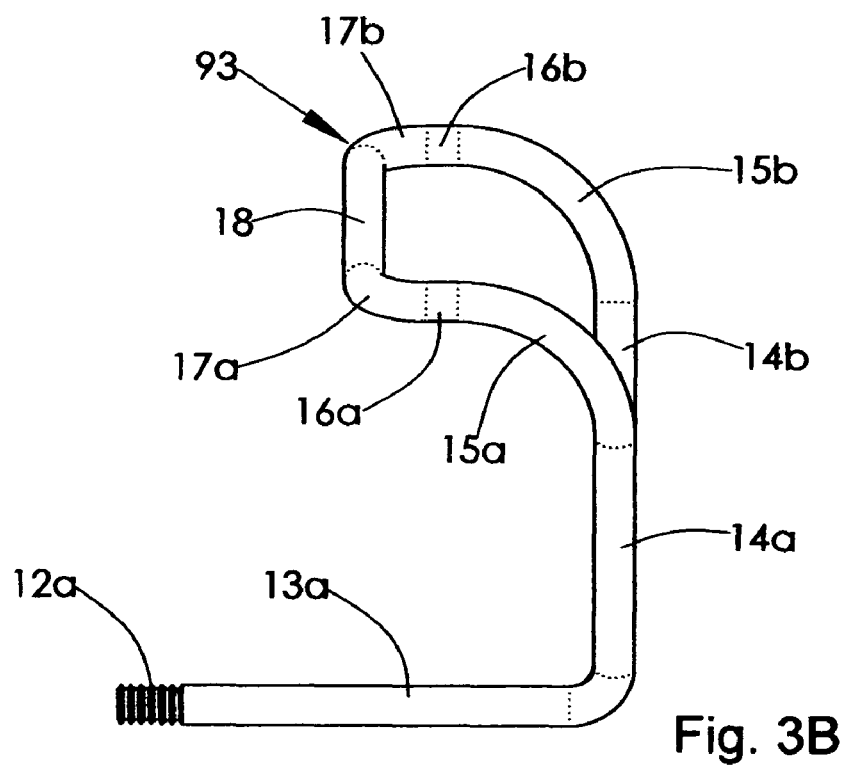
FIG. 3b is a side view of the third embodiment.

FIGS. 1f, 1h and 1i show coupling device 90 is made from a bent cylindrical shaped rod with threading 12a and 12b at both ends. The bent rod comprises a U-shaped structure 16a, 17a, 18, 17b, 16b in the middle portion of the rod, two inwardly bent curves 15a and 15b, respectively, continue with two unequal length poles 14a and 14b, and two bases 13a and 13b at ends of the rod. The cover of the U-shaped structure from the poles is significantly shorter than the length of the poles 14a and 14b.

FIG. 1f shows the bases 13a and 13b of the coupling device 90 line up at the inner side of pedal 80, for insertion into holes 5a, 5b, 6a and 6b. FIG. 1G shows the completed insertion and the bases are secured by hex nuts 1a and 1b and washers 2a and 2b on threading 12a and 12b.

FIGS. 1a, 1b and 1c show how the coupling device 90 is engaged by a human foot 39 on a right side bicycle pedal. The U-shaped portion 16a, 17a, 18, 17b, 16b and bends 15a and 15b are tilted toward the front side of the right pedal 80 and parallel the slope of the upper side of the right foot, because pole 14a is shorter than pole 14b by 16 millimeters. Therefore, in FIG. 1b, plane 31 on said U-shaped structure has an acute angle 33 of 22 degrees with respect to plane 32 on the pedal 80.

FIGS. 1c and 1d show the U-shaped portion 16a, 17a, 18, 17b, 16b and the bends 15a and 15b partially cover the engaging foot 39 across the top of the foot. Length dimension 38 defines the length of cover of the U-shaped structure from the poles 14a and 14b to cover bones in area 36 of the foot in FIG. 1e. The area 36 includes big toe bones, the first metatarsal bone, first cuneiform bone, second cuneiform bone and navicular bone. These bones are the biggest, strongest and highest bones at the inner side of a foot and deliver upward force to the U-shaped structure. In this example, the length 38 of the U-shaped cover is 40 millimeters.

Second Embodiment

Bases 13a and 13b of coupling device 94 are also designed to attach to a pedal 80 having two holes 5a and 5b, and 6a and 6b parallel to the pedal shaft. Coupling device 94 has two distinct features different from coupling device 90 of the first embodiment. First, the inwardly bent curves 15a and 15b of coupling device 94 are significantly smaller than the corresponding curves in the first embodiment. Second, coupling device 94 is designed to attach to a left pedal and be used by a left foot, because the U-shaped structure is an opposite configuration as compared to coupling device 90.

Third Embodiment

Coupling device 93 has a wide U-shaped structure 16a, 17a, 18, 17b, 16b, because pole 14a is 29 degrees off parallel to pole 14b, and pole 14a is shorter than pole 14b by 15 millimeters. Coupling device 93 is similarly designed to attach to a bicycle pedal 80 having two holes 5a, 5b, and 6a and 6b, on opposite sides of the pedal shaft. Coupling device 93 is designed to be used on a right side bicycle pedal because the shorter pole 14a is the forward most extension of the U-shaped structure when attached to the pedal 80.

When coupling device 93 inserts bases 13a and 13b into holes 5a, 5b and 6a, 6b of the pedal 80, pole 14b becomes perpendicular to the body of the pedal 80, and the U-shaped structure 16a, 17a, 18, 17b, 16b becomes 18 degrees off parallel to the body of the pedal 80.

I claim:

1. An inner side upper foot coupling device for a bicycle pedal made from a cylindrical rod, comprising:
   a middle portion of said rod having a U-shaped structure;
   each end of said U-shaped structure ending in a bend;
   two portions of said rod having different lengths, non-contiguous with one another, each of the two portions continuing one of the bends at each end of the U-shaped structure, said two portions extending the same direction from the U-shaped structure to form standing portions;
   wherein said U-shaped structure extends in the same direction from each of said standing portions to form a cover, said cover being shorter than each of the standing portions; and
   two ends of said rod comprising interlocking means, wherein said two ends are respectively arranged each of said two portions and extend from said two portions in the substantially the same direction as said U-shaped structure, wherein said two ends are parallel to one another and are fixed in a parallel position without causing deformation to said U-shaped structure; and
   wherein said two ends define a plane which is closer to a portion of the U-shaped structure at a side where the U-shaped structure is connected the portion of the two portions being shorter in length than a side of the U-shaped structure connected to the portion of the two portions being longer in length.

2. The inner side upper foot coupling device of claim 1, wherein said interlocking means comprises threading.

3. The inner side upper foot coupling device of claim 1, wherein said two portions of said rod are substantially parallel to one another.

4. The inner side upper foot coupling device of claim 1, wherein said two portions of said rod are substantially perpendicular to said U-shaped structure.

* * * * *